United States Patent [19]
Lonergan

[11] Patent Number: 5,965,180
[45] Date of Patent: Oct. 12, 1999

[54] GLAZE FOR DOUGH PRODUCTS

[75] Inventor: Dennis Lonergan, Medina, Minn.

[73] Assignee: The Pillsbury Company, Minneapolis, Minn.

[21] Appl. No.: 08/781,653

[22] Filed: Jan. 10, 1997

[51] Int. Cl.$^6$ .................................................. A21D 13/00
[52] U.S. Cl. ........................... 426/94; 426/302; 426/293; 426/549; 426/653; 426/446; 426/496
[58] Field of Search .................................. 426/15, 30, 94, 426/100, 166, 302, 549, 446, 293, 496, 653

[56] References Cited

U.S. PATENT DOCUMENTS

| | | | |
|---|---|---|---|
| 3,424,591 | 1/1969 | Gold | 99/100 |
| 3,427,951 | 2/1969 | Mitan et al. | 99/166 |
| 4,010,283 | 3/1977 | Canonne | 426/100 |
| 4,293,572 | 10/1981 | Silva et al. | 426/19 |
| 4,389,420 | 6/1983 | Yong et al. | 426/94 |
| 4,450,177 | 5/1984 | Larson et al. | 426/19 |
| 4,487,786 | 12/1984 | Junge | 426/302 |
| 4,645,674 | 2/1987 | Lang et al. | 426/94 |
| 4,657,769 | 4/1987 | Petrofsy et al. | 426/549 |
| 4,743,452 | 5/1988 | Felske et al. | 426/19 |
| 4,762,721 | 8/1988 | Holscher | 426/94 |
| 5,202,138 | 4/1993 | Stypula | 426/94 |
| 5,281,433 | 1/1994 | Gantwerker et al. | 426/549 |
| 5,492,707 | 2/1996 | Chalupa et al. | 426/302 |
| 5,707,676 | 1/1998 | Savelli | 426/549 |

FOREIGN PATENT DOCUMENTS 0 749 690 A1  12/1996  European Pat. Off. .

OTHER PUBLICATIONS

Unilever, Netherlands Patent Application NL 8501283 A (Abstract), 1986.
Valli et al., Nutrasweet Kelco Co., Research disclosure No. 398, 418, (Abstract), 1997.
Collin, *The New Orleans Cookbook*, Alfred A. Knopf, Inc., New York (1978).
Bath, et al., *A Laboratory–Scale Bagel–Making Procedure*, vol. 71, No. 5, 1994 American Association of Cereal Chemists, Inc., pp. 403–408.
Hoseney, *Principles of Cereal Science and Technology*, Second Editiion, American Association of Cereal Chemists, Inc., pp. 344–357.
Kroskey, "Snack Cake Earthquake", *Bak. Prod. and Mark.*, vol. 29, p. 32 (1994).
Beard, *Beard on Bread*, Ballantine Books, NY (1973).
Kroskey, "Take the Plunge With Soft Pretzels", *Bak. Prod. & Mark.*, vol. 31, p. 52 (1996).

*Primary Examiner*—Lila Feisee
*Assistant Examiner*—Eliane Lazar Wesley
*Attorney, Agent, or Firm*—Faegre & Benson LLP

[57] ABSTRACT

Shaped, unbaked dough products are provided that are coated with a glaze comprising an amount of water, a reducing sugar and a hydrophilic colloid. When baked, the dough products produce a finished product with increased horizontal dimensions over that which would be expected based on the raw dimensions of the unbaked dough product.

38 Claims, 1 Drawing Sheet

FIGURE 1

GLAZE FOR DOUGH PRODUCTS

BACKGROUND OF THE INVENTION

Bagels are the fastest-growing food on U.S. household breakfast menus. Consumers ate an average of 7 bagels per person in 1993, up from 2.6 in 1984. Nielsen North America, for the 52-week period ending Mar. 12, 1994, reports that sales of fresh bagels were about $118 million, a rise of about 34.9%, over sales in the previous year.

Sales of supermarket freezer-case bagels are also on the rise, despite the rapid increase of retail franchises across the nation selling freshly-baked bagels. Chicago-based Information Resources Inc. (IRI) reports the frozen bagel market increased 10.9% for the 52-week period ending Jun. 19, 1994. Total dollar sales for this time period for frozen bagels approached $249 million. As a result, the Food Marketing Institute now estimates that frozen bagels are the second highest-volume frozen food, after orange juice.

Heavy promotion by supermarkets and independent bagel shops is the driving force behind the increase in demand for bagels. The retention of the consumer's interest is most likely attributable to the bagel's ability to "change with the times", i.e., with the introduction of new and unique flavors and new "snack" sizes. Additionally, bagels retain their popularity because they fill many consumer demands. Not only are bagels healthy, they contain no cholesterol and very little fat, they also are versatile, providing the basis for a wide variety of menu possibilities for breakfast, lunch and dinner.

However, due to the special processing required to produce bagels, their availability, and thus their consumer acceptance, remains limited. Specifically, bagels must be simmered in boiling water prior to baking. If this boiling step is omitted, the bagel dough simply bakes up into a hard dinner roll shaped product. The only substitute for this step is steam injection during baking. Kroskey, *Bak. Prod. and Mark.*, 29, 32 (1994). However, the resulting bagels are not equivalent in taste and texture to those that have been boiled.

Because normal baking techniques are not applicable to the production of finished bagels, supermarkets and other baked goods suppliers are frequently unable to keep pace with consumer demand. Therefore, these suppliers have been required to purchase estimated quantities from local bakeries in advance. This solution, however, has proven to be unsatisfactory since it is difficult to estimate quantities accurately and any extra bagels become stale, and therefore, unsaleable, quickly.

Furthermore, although frozen bagels have gained popularity, the bagel making process using frozen dough has several serious problems. First of all, frozen, pre-boiled bagels must be thawed and proofed before they can be baked, causing a time delay in the availability of fresh bagels. Secondly, the stability of the frozen, pre-boiled dough is reduced in the freezing and thawing process, resulting in a bagel with a less than desirable texture. Finally, frozen, prebaked bagels become extremely hard within several hours after being reheated, resulting in consumer dissatisfaction.

These problems have been widely recognized, yet there is no alternative process that provides a commercially acceptable product. Therefore, there is a need for an unbaked bagel which can be stored at a supermarket for long periods and freshly prepared as needed.

SUMMARY OF THE INVENTION

The present invention provides a shaped, unbaked, dough product coated on at least the upper surface thereof with a glaze that is effective to increase the horizontal dimensions, i.e., the width and/or length, of said product when the dough product is baked. Preferably, the glaze comprises from about 80 to about 98.9% water, from about 0.1 to about 5% of a reducing sugar and from about 0.1% to about 15% of an edible hydrophilic colloid. Preferably, the reducing sugar is maltose, isomaltose, cellobiose, lactose, melibiose, gentiobiose, rutinose, fructose or dextrose. More preferably, the reducing sugar is dextrose. It is further preferred that from about 8 to about 20 g of glaze are applied per 100 grams of dough product.

It is preferred that the glaze has a viscosity of from about 1,500 to about 20,000 centipoise, measured at 20° C. on a Brookfield viscometer (model RVTD) at 5 rpm with a spindle size of 1–6, depending on the viscosity of the glaze. In this regard, the hydrophilic colloid utilized may be any edible hydrophilic colloid that is capable of producing a glaze that is within this viscosity range when present in the aforementioned amount with the reducing sugar. Preferably, the hydrophilic colloid is selected from the group consisting of a starch (including pre-gelatinized starch and chemically-modified starch), a natural gum, or a chemically-modified polysaccharide. More preferably, the hydrophilic colloid is pre-gelatinized starch. Optionally, the hydrophilic colloid may comprise an amount of totally gelatinized starch, fully hydrated gums or a modified cellulose effective to enhance the sheen of the final baked product. If a modified cellulose is to be included in the hydrophilic colloid, it is preferred that it be hydroxypropyl methylcellulose. If a gum is to be included, it is preferably guar gum.

As is understood by those of skill in the art, the dimensions of a baked or cooked dough product are related to the dimensions of the raw dough product. However, Applicant has now made the surprising discovery that, by applying the aforementioned glaze to dough products prior to baking, the horizontal dimensions, i.e., the length or width, of the baked dough product can be increased as compared to an unglazed baked dough product. The effects of the glaze will depend on the shape of the dough product to which the glaze is applied. For example, a glazed roll dough piece, upon baking attains a greater width than an unglazed roll dough. A glazed loaf dough, upon baking, attains a greater length than an unglazed loaf dough. Thus, the aforementioned glaze, when applied to an unbaked dough product, provides the advantage of reducing the proofing time required to produce a baked dough product of a certain length or width.

In this regard, the present invention also provides a method of increasing the horizontal dimensions of a bakery product comprising coating a shaped, unbaked dough product with the aforementioned glaze, and baking the dough product.

In addition to the dimensional effects of the glaze, Applicant has also discovered that the glaze can be used to impart organoleptically desirable characteristics to the product. For example, the application of the glaze to bagel dough results in the formation of a traditional chewy outer crust, without the heretofore required boiling step. When applied to loaf or roll doughs, the glaze imparts a glossy finish to the outer surface upon baking, thereby improving the appearance and texture of the product.

Applicant has also discovered that the application of the aforementioned glaze to an unbaked dough product mimics the boiling step heretofore required in the production of certain dough products. Thus, the present invention also provides a method of preparing a baked dough product comprising coating a shaped, unbaked dough product with the aforementioned glaze, and baking said shaped, unbaked dough product to yield a baked dough product. The method does not comprise boiling or steaming said unbaked dough product. Analogously, the present invention provides a baked dough product prepared by the same process, e.g., a process comprising a shaped, unbaked dough product with the aforementioned glaze, baking said shaped, unbaked dough product without first steaming or boiling said shaped, unbaked dough product.

For example, utilizing the glaze of the present invention, the boiling step heretofore required in the production of bagels can be eliminated. In the conventional process, raw bagel dough is formed into a toroid (a doughnut-shape) and then boiled. It is during the boiling step that the bagel expands, and in particular, increases its width to height ratio. Applicant has now discovered that the horizontal dimensions, and thus, the width to height ratio of bagels can be increased (and the desired texture achieved) by simply coating unbaked bagel dough with the aforementioned glaze and baking. In contrast, if an unglazed bagel, formed into the characteristic toroidal shape, is baked without first being boiled, the product loses its toroidal shape and takes on the shape of a dinner roll. Furthermore, it is an additional aspect of this embodiment of the invention that an unbaked bagel coated with the aforementioned glaze can proceed directly from the freezer to the baking oven without thawing or proofing.

Therefore, the unbaked dough product utilized in the present invention may be any unbaked dough product for which it is desirable to increase the horizontal dimensions to a greater extent than obtained by baking an unglazed dough product, or where it is desirable to decrease the required proofing time. Furthermore, the dough product may be any dough product for which it is desirable to eliminate or mimic a previously required boiling step. Finally, the dough product may be any dough product wherein it is desirable to impart certain desirable organoleptic characteristics to the final baked product. For example, the dough product may be a bagel, a pretzel, flat bread, brioche, challah, a biscuit, a scone, a dinner roll, a loaf of French bread, pita bread, a croissant, an egg twist, limpa, kugelhopf, verterkake, an English muffin or a bread stick, and the like. Additionally, the dough product may be frozen, refrigerated, or fresh, i.e., stored at ambient temperature.

It is contemplated that the glaze of the present invention will also be effective to increase other dimensions and/or the overall baked product geometry of unbaked dough products upon baking. That is, it is expected that, utilizing the glaze of the present invention, the height, baked specific volume or cross-sectional area of the baked product can also be increased over that which would be attainable from the corresponding unglazed dough product.

All percentages are by weight (wt %) unless otherwise indicated.

DETAILED DESCRIPTION OF THE INVENTION

A. Unbaked Dough Products

As mentioned hereinabove, unbaked dough products suitable for use in the present invention include any dough product wherein it is desirable to produce a finished product with increased horizontal dimensions over that which would normally be achievable on the basis of the horizontal dimensions of the unbaked dough. Furthermore, the unbaked dough products contemplated by the present invention are also those products which would benefit from the ability to be taken directly from the freezer (i.e. below 0° F.), or refrigerator (i.e., from about 35° to about 40° F.), to the oven without a thawing or proofing step. For example, the unbaked dough products may yield bagels, pretzels, flat breads, brioche, challah, biscuits, scones, dinner rolls, French bread, pita bread, croissants, egg twists, limpa, kugelhopf, verterkake, English muffins or bread sticks, and the like.

The unbaked dough formulations of each of the above listed dough products are well known to those of skill in the art, and are readily available to the public in commercial cookbooks. For example, *Beard on Bread*, incorporated herein by reference, contains at least one exemplary formulation for many of the above listed dough products. Beard, *Beard on Bread*, Ballantine Books, NY (1973). An exemplary formulation for bagels is disclosed in Examples 1 and 2, hereinbelow. An exemplary formulation for pretzels can be found in Krosky, *Bak. Prod. & Mark.*, 31, 52 (Aug. 15, 1996), incorporated herein by reference.

Generally, the unbaked dough products suitable for use in the present invention are composed with the usual ingredients known to those of skill in the art, e.g., flour, water, yeast and salt. In addition to these basic ingredients, the dough products of the present invention may contain sugar, non-fat milk solids, shortening, gums, surfactants and film-forming proteins. The dough products may further comprise flavorings, thickeners (e.g. starches and hydrophilic colloids), nutrients (e.g. carbohydrates, proteins, lipids, etc.), antioxidants, antimicrobial agents, eggs and egg solids, acidulants, dough conditioners and enzymes, emulsifiers such as mono- and diglyceride, sodium stearoyl lactylate, vitamins, and the like.

Non-fat milk solids which can be used in the compositions of this invention are the solids of skim milk and include proteins, mineral matter and milk sugar. Other proteins such as casein, sodium caseinate, calcium caseinate, modified casein, sweet dairy whey, modified whey, and whey protein concentrate can also be used herein.

Dry or liquid flavoring agents, fruit and vegetables may also be added to the formulation. These include cocoa, vanilla, chocolate, coconut, peppermint, pineapple, cherry, nuts, spices, salts, poppy or sesame seeds, onion, garlic, cheese, tomatoes, scallions, oat bran, jalapeno peppers, cinnamon, raisins, chocolate chips, apples, berries, bananas walnuts, lemon, flavor enhancers, among others.

Acidulants commonly added to foods include lactic acid, citric acid, tartaric acid, malic acid, acetic acid, phosphoric acid, and hydrochloric acid.

Dough conditioners commonly added to dough products include potassium sorbate, L-cysteine hydrochloride, mono- and diglycerides, polysorbates, sodium stearoyl lactylate, ascorbic acid, diacetyltartaric acid esters of mono- and di-glycerides and sodium bisulfite. These conditioners serve to add functionality, reduce mix times and yield slacker doughs.

The mixing times, temperatures and speeds for processing the dough product are known in conventional dough processing technology, but may vary depending on the particular product being prepared. Particular mixing times, temperatures and speeds for particular products can be readily determined by one skilled in the art using conventional processing technology.

B. The Glaze

The glaze of the present invention comprises a major amount of water, as well as dextrose, and an edible hydrophilic colloid. Specifically, it is preferred that the glaze contain from about 80 to about 98.9% water, from about 0.1% to about 5% dextrose, or other reducing sugar, and from about 0.1% to about 10% of an edible hydrophilic colloid.

Reducing sugars are well known to those of skill in the art. For example, reducing sugars suitable for use in the present invention include maltose, isomaltose, cellobiose, lactose, melibiose, gentiobiose, rutinose, fructose or dextrose.

Furthermore, in addition to incorporating dry or liquid flavoring agents into the dough product, flavoring agents may also be added to the glaze. For example, the glaze may further comprise spices, salts, garlic, cheeses, oat bran, cinnamon, cornmeal, lemon, coconut, orange, cherry, butter or butter flavor and flavor enhancers, among others.

Hydrophilic colloids suitable for use in the present invention are those capable of producing an end product of the recited viscosity and functionality. For example, known hydrophilic colloids which are suitable for use in the present invention include, but are not limited to, starches (including pre-gelatinized starch and chemically-modified starch), natural gums, and chemically-modified natural polysaccharides, e.g., modified cellulose.

1. Starch

Starch is a high molecular weight carbohydrate of the general formula $(C_6H_{10}O_5)_n$. Starch granules exhibit a structure of concentric sheets which contain an elutable amylose fraction in the inner layers and an amylopectin fraction in the outer layers. As used herein, the term "starch" includes raw starch, pre-gelatinized starch, and chemically-modified starch. When starch granules are contacted with water and heated above a temperature designated as the gel point, the granules begin to bind water and swell. The gel temperature for a particular starch variety depends on a number of factors, including particle size, pH and absolute concentration. If the weight ratio of starch to water is high enough, the effect of exceeding the gel temperature will be to gel substantially all of the water into a thick paste.

Starches useful in the present glaze may be selected from any of a wide variety of commercially available products including but not limited to, barley, corn, potato, wheat, rice, waxy maize, sago, sorghum, arrowroot, tapioca or mixtures thereof. These raw starches typically have granules sized within the range of about 2–150 microns, as measured along the longest axis, and exhibit gel temperatures of about 55°–80° C. Since these starches can bind about 60–100% of their weight in water, for most glazing applications, useful amounts of the pre-gelatinized starch will fall within the range of about 1–15%, preferably about 2–10% and most preferably about 3–7% of the total net weight of the glaze.

2. Other hydrophilic colloids

The hydrophilic colloid may also be a natural gum. For example, the hydrophilic colloid may be xanthan gum, gum tragacanth, locust bean gum, carrageenan, guar gum, algin, alginate, gelatin, Irish moss, pectin, gum arabic, gum ghatti, gum karaya and plant hemicelluloses, e.g. corn hull gum. If the hydrophilic colloid is to be a gum, it is preferred that guar gum or other gums that are shear stable and do not require heating prior to use, be utilized.

Additionally, the hydrophilic colloid may be a chemically-modified polysaccharide, such as a modified cellulose, prepared by partial hydrolysis of natural cellulose and subsequent chemical modification by etherification, carboxymethylation, or similar reaction. Examples of chemically-modified polysaccharides useful in the present invention include, but are not limited to methylcellulose, ethylcellulose, methyl ethyl cellulose, 2-hydroxyethyl ethylcellulose, 2-hydroxyethyl methylcellulose, 2-hydroxypropylcellulose, 2-hydroxypropymethylcellulose, hydroxyethycellulose and similar synthetic cellulose ethers. Other suitable chemically-modified polysaccharides include such ionic alkylcellulose ethers are carboxymethyl cellulose, carboxymethyl ethyl cellulose, carboxymethyl hydroxyethyl cellulose and their water-soluble salts. The term "chemically-modified polysaccharide" as used herein also refers to semi-synthetic hydrocolloids such as hydroxypropyl alginates and hydroxypropyl starch.

Optionally, the glaze may contain an amount of hydrophilic colloid which acts to impart a "sheen" on the surface of the final baked product. Any hydrophilic colloid which is capable of adhering well to the dough product, i.e. any hydrophilic colloid which is generally recognized for its film-forming abilities, is useful for this purpose. For example, modified celluloses, as described hereinabove, are useful for this purpose. For example, Methocel E15®, a hydroxypropyl methylcellulose, is commercially available from Dow Chemical Co., Midland Mich. Also useful as sheen-imparting hydrophilic colloids are fully gelatinized starches or hydrated gums.

It has surprisingly been found that a glaze in accordance with the invention containing a sheen-imparting hydrophilic colloid, can effectively withstand the freezing and subsequent baking operations and provide sheen on the product after baking. The resulting sheen on the outer surface of the product remains for an extended period of time as compared to a sheen-imparting glaze applied after baking, such as an egg wash or a butter glaze. It has been found that while a glaze applied to a product after baking retains its sheen for about 20 minutes, the sheen imparted by the glaze of the present invention remains on the surface of the product for an hour or longer. This is particularly useful for the retail baking industry in which the fresh-baked appearance of the product is an important attribute. Using the glaze of the invention also avoids the need for the baker to glaze the products after baking, saving a time-consuming step. The invention thus provides a frozen, glazed dough product which can be baked directly from the frozen state without an intermediate cooking step, to provide a baked product with the desired dimensional increases, which does not require the application of an additional glaze after baking to provide a sheen to the surface of the dough.

3. Glaze viscosity

Applicant has determined that the ability of the glaze to provide the enhanced baked product geometry depends upon the thickness of the glaze applied to the bakery product, which is, in turn, dependent upon the viscosity of the glaze. Specifically, Applicant has determined that a glaze having a viscosity of 1,500 to about 20,000 centipoise (20° C., 5 rpm, spindle size from 1–6, Brookfield viscometer, model RVTD) applied to the surface of the dough product in an amount from about 8 g to about 20 g per 100 g of dough product, adheres adequately to the dough product and produces a final baked product with the desired characteristics.

C. Method of Producing Baked Goods with Enhanced Baked Product Geometry

Applicant has made the surprising discovery that, simply by glazing a dough product, an increase in horizontal dimensions can be achieved over that which would be expected over the horizontal dimensions of the unbaked dough product. It is believed that the glaze on the dough's surface keeps the outer surface of the dough malleable, therefore delaying the setting of the outer dough structure. Specifically, it is believed that the glaze provides a means of retaining water on the dough's surface and that this presence of water delays the onset of crust formation. In this manner, the outer surface continues to expand as the inner dough is heated, resulting in the observed increase in horizontal dimensions.

1. Bagels and Pretzels

Additionally, it has been discovered that the application of the glaze to dough products that heretofore required a boiling or steaming step can eliminate the need for such a boiling or steaming step while still achieving the desired final product characteristics. For example, while both pretzel and bagel preparation heretofore have required a boiling step (or baking in a steam-injection oven) in order to produce the desirable geometry, flavor and texture for these products, the method of the present invention eliminates the need for such a step.

The traditional method of producing bagels as compared to the method of producing bagels provided by the present invention is summarized in Table 1. R. C. Hoseney, cited supra. Additionally, the traditional method of producing pretzels as compared to the method of preparing pretzels provided by the present invention is summarized by Table 2. Krosky, cited supra. As is illustrated, both dough products are conventionally boiled, in the case of bagels, to provide the desired geometry, and in the case of pretzels, to impart their characteristic flavor.

In the case of traditionally-prepared bagels, boiling the dough in excess water prevents the outer crust from forming and permits the bagel to expand to its desired geometry. It is only upon baking, when the excess surface moisture is driven off, that crust setting takes place. In fact, traditionally prepared bagels, which are boiled for at least 90 seconds per side, do not expand significantly during the baking step, indicating that the baked product geometry is achieved during the boiling step.

The glaze of the present invention mimics the effects of boiling (or steam baking) by maintaining excess water on the dough product's surface for enough time to permit the dough to expand to the desired geometry, after which the crust sets to provide the desired chewy texture. The glaze therefore permits eliminating the boiling step altogether, allowing the baker to make the bagel or pretzel in a single cooking step.

Figure 1:
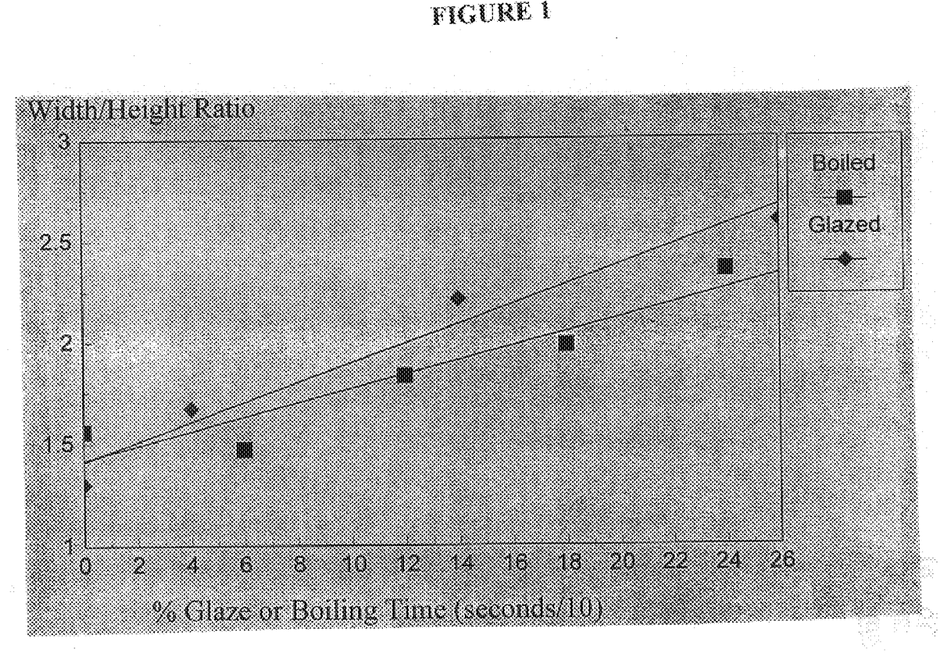
FIG. 1 is a graph that depicts that the width to height ratio of a bagel increases as either the boiling time or amount of glaze increases.

The effects of the glaze can be most effectively appreciated by comparing the width to height ratio of glazed, unboiled bagels to the width to height of unglazed, boiled bagels. See FIG. 1. As is shown in FIG. 1, the width to height ratio of a bagel increases as either the boiling time or amount of glaze increases. That is, the application of the glaze to a raw bagel that is baked, but not boiled, results in a bagel with the same desired width to height ratio as a an unglazed raw bagel that is boiled and then baked. Specifically, the width to height ratio of bagels is preferably greater than about 1.5, more preferably, the width to height ratio is greater than 2.0, and most preferably, the width to height ratio for bagels is greater than 2.5.

2. Other Dough Products

In a similar way, the glaze delays the onset of crust setting on other dough products, such as rolls, biscuits and loaves. Because the onset of crust setting is delayed, the outer surface of the dough remains malleable for a longer period of time, permitting the dough to expand for a longer period of time, ultimately resulting in increased horizontal dimensions.

The desired geometries of these products are typically determined by the initial dough geometry as they enter the oven. For example, a loaf of French bread, that is typically longer than it is wide or tall, generally maintains the same ratio of length:height:width when it is baked. Using the glaze of the present invention, however, it was surprisingly discovered that an increase in horizontal dimensions was achieved that was unexpected based on the raw dimensions. For example, the same loaf of French bread, when coated with the present glaze, would have a greater length:height:width ratio than would be observed for the corresponding unglazed loaf.

Thus, the present invention is a method of achieving increased horizontal dimensions from unbaked dough products over that which would be expected based on their initial, unbaked raw product dimensions. Specifically, the method comprises the application of the aforementioned glaze to the surface of a dough product prior to being baked. The glaze may be applied to a fresh dough product that is to be frozen (i.e. stored at 0° F. or below), an unbaked dough product that is already frozen, or a refrigerated (i.e., stored at from about 35° to about 40° F.) dough product.

TABLE 1

| Glazed Bagel Production | Traditional Bagel Production |
| --- | --- |
| Mix Bagel Dough with Sponge | Mix Bagel Dough |
| ↓ | ↓ |
| Form 100 g Bagels | Form 100 g Bagels |
| ↓ | ↓ |

TABLE 1-continued

TABLE 2

TABLE 2-continued

The invention will be further described by reference to the following detailed examples.

Example 1

Glazed frozen bagels

Bagels were prepared utilizing the glaze and method of the present invention. The composition of the dough, glaze, and sponge mixture is shown in Table 3, hereinbelow.

TABLE 3

Sponge assembly

The sponge was assembled by combining 200 g water, 30 g yeast and 200 g flour. The resulting mixture was allowed to ferment for 60 minutes at 70° F.

Bagel dough assembly

Flour (931 g), 395 g of water, 50 g of gluten, 4.0 g of dough conditioners, 80 g of eggs, 30 g of buttermilk solids, 40 g of butter, 30 g of sucrose and 20 g of salt were combined with the sponge in the bowl of a Hobart mixer with a vertical mixing arm. The dough was mixed for 1 minute on speed 1, then for 11 minutes on speed 2.

Bagel formation and baking

TABLE 4

Dough, Glaze and Sponge Composition

| Dough | | Sponge[a] | | Bagel glaze | |
|---|---|---|---|---|---|
| 51.1% | Flour | 8.0% | Water | 4.0% | Starch |
| 20.2% | Water | 1.0% | Compressed yeast | 1.0% | Methocel ® E15 |
| 2.5% | Gluten | | | | |
| 0.2% | Dough conditioners | 8.0% | Flour | 1.0% | Dextrose |
| | | | | 94.0% | Water |
| 2.0% | Buttermilk solids | | | | |
| 6.0% | Eggs | | | | |
| 1.0% | Salt | | | | |

[a]Percentage of sponge and dough ingredients are based upon dough + sponge.

Glaze assembly

The glaze was prepared by placing 935 g water into a blender. While the water was being agitated, 10 g Methocel® E15, 10 g dextrose and 40 g starch (pre-gelatinized waxy maize) were added, and the mixture stirred for 15 seconds. The glaze was then transferred to a container and stored at 40° F. overnight.

Sponge assembly

The sponge was assembled by combining 104 g water, 13 g yeast and 104 g flour. The resulting mixture was allowed to ferment for 60 minutes at 70° F.

Bagel dough assembly

Flour (664.3 g), 208 g of ice, 52 g of water, 32.5 g of gluten, 2.6 g of dough conditioners, 78 g of eggs, 26 g of buttermilk solids and 13 g of salt were combined with the sponge in the bowl of a Hobart mixer with a vertical mixing arm. The dough was mixed for 30 seconds on speed 1, then for 7.5 minutes on speed 2.

Bagel formation and baking

The dough was removed from the bowl and cut into twelve, 100 g sections. Each section was rolled into a 10 inch cylinder and then molded into a tori or bagel. The bagels were placed on a parchment-covered baking sheet and stored at 70° F. for 25 minutes. (Optionally, the bagels could be retarded at this point for 16 hours at 34° F.) At the end of 25 minutes, the bagels were placed in a 0° F. freezer for 20 hours. The bagels were then removed from the freezer and their top surfaces (the surface not in contact with the baking sheet) were dipped into the glaze. The bagels were then placed on a parchment-covered baking tray and stored in a 0° F. freezer for 2 hours. Finally, the bagels were placed on greased baking tray and baked at 400° F. for 29 minutes, or until golden brown, in a conventional oven.

The resulting bagels had a glossy surface sheen, a chewy outer texture, and were golden brown in color. The baked specific volume of these bagels was 2.9.

EXAMPLE 3

Glazed frozen vs. Glazed fresh bagel dough

Glaze, sponge and dough assembly were performed according to Example 1. The resulting dough was separated into two groups, one of which was prepared identically to the "Bagel formation and baking" protocol outlined in Example 1, and the other that was prepared without a freezing step, as follows:

The dough (prepared as described in Example 1) was cut into twelve, 100 g sections. Each section was rolled into a 10 inch cylinder and then molded into a bagel shape. The bagels were placed on a parchment-covered baking sheet and proofed at 70° F. for 25 minutes. The top surfaces of the bagels were then dipped into the glaze (prepared as in Example 1). The bagels were then placed on greased baking tray and baked at 400° F. for 29 minutes, or until golden brown, in a conventional oven. The resulting bagels were also compared to freshly made, conventional bagels obtained from commercial sources, specifically, the bagels were compared to bagels purchased from Bruegger's Bagel Bakery and Uptown Bagels, both in Minneapolis, Minn. The results of this experiment are summarized in Table 5, hereinbelow. Briefly, it was found that the glazed, unfrozen bagel dough and glazed fresh bagel dough showed the same increase in horizontal dimensions over unglazed, unfrozen bagel dough. Furthermore, the glazed bagels, either fresh or frozen, were comparable in height, width and baked specific volume to the fresh bagels obtained commercially.

TABLE 5

Comparison of Glazed, Fresh vs. Glazed, Frozen Bagel Dough

| | | Bagel Measurement (cm or cc/gr) | | | |
|---|---|---|---|---|---|
| Bagel | Glaze (g/100 g) | Height | Width | W/H Ratio | BSV |
| Unfrozen | | | | | |
| Unglazed | NA | 5.5 | 8.7 | 1.6 | 2.7 |
| Glazed | 12 | 3.8 | 10.3 | 2.7 | 2.6 |
| Frozen | | | | | |
| Unglazed | NA | 5.3 | 8.8 | 1.7 | 2.7 |
| Glazed | 14 | 3.9 | 10.1 | 2.6 | 2.7 |
| Bruegger's | NA | 3.7 | 9.9 | 2.7 | 2.3 |
| Uptown | NA | 3.7 | 10.8 | 2.9 | 2.4 |

EXAMPLE 5

Glazed frozen pretzels

Pretzels were prepared utilizing a glaze and method of the present invention. The general composition of the dough, glaze, and sponge mixture is shown in Table 6, hereinbelow.

TABLE 6

Dough, Glaze and Sponge Composition

| Dough | | Sponge[a] | | Starch glaze | |
|---|---|---|---|---|---|
| 46.7% | Flour | 10.0% | Water | 3.0% | Potato Starch |
| 17.6% | Water | 1.5% | Compressed yeast | 96.0% | Water |
| 2.5% | Gluten | | | | |
| 0.2% | Dough conditioners | 10.0% | Flour | 1.0% | Dextrose |
| | | | | | NaOH glaze |
| 1.5% | Buttermilk solids | | | 5% | NaOH (food grade) |
| 4.0% | Eggs | | | 95% | Water |
| 1.0% | Salt | | | | |
| 4.0% | Butter | | | | |
| 1.0% | Sucrose | | | | |

[a]Percentage of sponge and dough ingredients are based upon dough + sponge.

Glaze assembly

The glaze was prepared by placing 960 g water into a blender. While the water was being agitated, 10 g dextrose and 30 g starch were added, and the mixture stirred for 15 seconds. The glaze was then transferred to a container, heated to a temperature of approximately 212° F. (or until mixture was clear) and stored at 40° F. overnight.

NaOH Glaze assembly

The sodium hydroxide glaze was prepared by adding 50 grams of food grade sodium hydroxide to 950 g water.

Sponge assembly

The sponge was assembled by combining 200 g water, 30 g yeast and 200 g flour. The resulting mixture was allowed to ferment for 60 minutes at 25° C.

Pretzel dough assembly

Flour (933 g), 353 g of water, 50 g of gluten, 4 g of dough conditioners, 80 g of eggs, 80 g of butter, 30 g of buttermilk solids, 20 g sucrose and 20 g of salt were combined with the sponge in the bowl of a Hobart mixer with a vertical mixing arm. The dough was mixed for 30 seconds on speed 1, then for 10 minutes on speed 2.

Pretzel formation and baking

The dough was removed from the bowl and cut into 50 g sections. Each section was rolled into a 20 inch cylinder and then molded into a pretzel shape. The pretzels were placed on a parchment-covered baking sheet and placed in a −23° C. freezer for 2 hours. The pretzels were then removed from the freezer and dipped into the NaOH glaze, and returned to the freezer. After one hour, the pretzels were removed from the freezer and their top surfaces (the surface not in contact with the baking sheet) were dipped into the starch glaze. The pretzels were then returned to the freezer until baking. Finally, the pretzels were placed on greased baking tray and baked at 400° F. for 22 minutes, or until golden brown, in a conventional oven.

The resulting pretzels had a glossy surface sheen, a chewy outer texture, and were golden brown in color.

All publications, patents and patent documents are incorporated by reference herein, as though individually incorporated by reference. The invention has been described with reference to specific and preferred embodiments and techniques. However, it should be understood that many variations and modifications may be made while remaining within the spirit and scope of the invention. Specifically, while the glaze of the present invention has been described and exemplified herein as being capable of increasing the horizontal dimensions of an unbaked dough product upon baking, the glaze can be effective to increase other dimensions, the baked specific volume and/or the cross-sectional area of dough products under conditions available to the art worker.

What is claimed is:

1. A shaped, unbaked, dough product having a boiled attribute imparting glaze coated on at least an upper, exposed surface thereof, said boiled attribute imparting glaze comprising from about 80% to about 98.9% by weight water, from about 0.1% to about 5% by weight of a reducing sugar, and from about 0.1% to about 15% by weight of an edible hydrophilic colloid, and wherein said glaze is effective to increase the horizontal dimensions of said dough product when baked as compared to the horizontal dimensions of a corresponding unglazed dough product.

2. The glazed dough product of claim 1 wherein the dough is frozen.

3. The glazed dough product of claim 1 wherein the dough is refrigerated.

4. The glazed dough product of claim 1 wherein the dough is fresh.

5. The glazed dough product of claim 1 wherein the glaze is applied in an amount of from about 8 g to about 20 g per 100 g of dough product.

6. The glazed dough product of claim 1 wherein the dough is bagel, pretzel, flat bread, brioche, challah, biscuit, scone, dinner roll, French bread, pita bread, croissant, egg twist, limpa, kugelhopf, verterkake, English muffin or bread stick dough.

7. The glazed dough product of claim 6 wherein the dough is bagel dough or pretzel dough.

8. The glazed dough product of claim 1 wherein the glaze has a viscosity of from about 1,500 to about 20,000 centipoise.

9. The glazed dough product of claim 1 wherein the reducing sugar is maltose, isomaltose, cellobiose, lactose, melibiose, gentiobiose, rutinose, fructose or dextrose.

10. The glazed dough product of claim 1 wherein the reducing sugar is dextrose.

11. The glazed dough product of claim 1 wherein the hydrophilic colloid is a starch, a natural gum, a chemically-modified polysaccharide or a combination thereof.

12. The glazed dough product of claim 11 wherein the hydrophilic colloid is pre-gelatinized starch.

13. The glazed dough product of claim 1 wherein the hydrophilic colloid further comprises an amount of a modified cellulose effective to impart a sheen to the baked product.

14. The glazed dough product of claim 13 wherein the modified cellulose is hydroxypropyl methyl cellulose.

15. A shaped, unbaked, dough product having a boiled attribute imparting glaze coated on at least an upper, exposed surface thereof, said boiled attribute imparting glaze comprising from about 80% to about 98.9% by weight water, from about 0.1% to about 5% by weight dextrose, and from about 0.1% to about 15% by weight pre-gelatinized starch, wherein the glaze has a viscosity of from about 1,500 to about 20,000 centipoise and wherein said glaze is effective to increase the horizontal dimensions of said dough product when baked as compared to the horizontal dimensions of a corresponding unglazed dough product.

16. A method of increasing the horizontal dimensions of a baked dough product comprising coating an unbaked dough product on at least an upper, exposed surface thereof with a boiled attribute imparting glaze comprising from about 80% to about 98.9% by weight water, from about 0.1% to about 5% by weight of a reducing sugar, and from about 0.1% to about 15% by weight of an edible hydrophilic colloid, and wherein said glaze has a viscosity of from about 1,500 to about 20,000 centipoise, and baking said unbaked dough product.

17. The method of claim 16 wherein the glaze is applied in an amount of from about 8 g to about 20 g per 100 g of dough product.

18. The method of claim 16 wherein said baked dough product is a bagel, a pretzel, flat bread, brioche, challah, a biscuit, a scone, a dinner roll, a loaf of French bread, pita bread, a croissant, an egg twist, limpa, kugelhopf, verterkake, an English muffin or a bread stick.

19. The method of claim 18 wherein said baked dough product is a bagel or a pretzel.

20. The method of claim 19, which does not comprise a steaming or boiling step prior to baking.

21. The method of claim 16, further comprising freezing said unbaked dough product prior to baking.

22. The method of claim 21, which does not comprise a thawing step prior to baking.

23. A water based, boiled attribute imparting glaze for an unbaked dough product comprising from about 80% to about 98.9% by weight water, from about 0.1% to about 5% by weight of a reducing sugar, and from about 0.1% to about 15% by weight of an edible hydrophilic colloid, and wherein said boiled attribute imparting glaze has a viscosity of from about 1,500 to about 20,000 centipoise and wherein said glaze is effective to increase the horizontal dimensions of said unbaked dough product when coated on at least an upper, exposed surface thereof and baked as compared to the horizontal dimensions of a corresponding unglazed dough product.

24. The glaze of claim 23 wherein the hydrophilic colloid is starch, a natural gum, a chemically-modified polysaccharide, or a combination thereof.

25. The glaze of claim 24 wherein the hydrophilic colloid comprises pre-gelatinized starch.

26. The glaze of claim 23 wherein the hydrophilic colloid comprises a modified cellulose.

27. The glaze of claim 26 wherein the modified cellulose is hydroxypropyl methylcellulose.

28. The glaze of claim 23 wherein the reducing sugar is maltose, isomaltose, cellobiose, lactose, melibiose, gentiobiose, rutinose, fructose or dextrose.

29. The glaze of claim 28 wherein the reducing sugar is dextrose.

30. A method of preparing a baked dough product comprising:
   (a) coating a shaped, unbaked dough product on at least an upper, exposed surface thereof with a boiled attribute imparting glaze comprising from about 80% to about 98.9% by weight water, from about 0.1% to about 5% by weight of a reducing sugar, and from about 0.1% to about 15% by weight of an edible hydrophilic colloid, wherein said glaze has a viscosity of from about 1,500 to about 20,000 centipoise; and
   (b) baking said shaped, unbaked dough product to yield a baked dough product;
wherein said method does not comprise steaming or boiling the unbaked dough product.

31. The method of claim 30 wherein the glaze is applied in an amount of from about 8 g to about 20 g per 100 g of dough product.

32. The method of claim 30 wherein said baked dough product is a bagel or a pretzel.

33. The method of claim 32 wherein said baked dough product is a bagel.

34. The method of claim 30, further comprising freezing said unbaked dough product prior to baking.

35. The method of claim 34, which does not comprise a thawing step prior to baking.

36. A baked dough product prepared by a process comprising the steps of
   (a) coating a shaped, unbaked dough product on at least an upper, exposed surface thereof with a boiled attribute imparting glaze comprising from about 80% to about 98.9% by weight water, from about 0.1% to about 5% by weight of a reducing sugar, and from about 0.1% to about 15% by weight of an edible hydrophilic colloid, wherein said glaze has a viscosity of from about 1,500 to about 20,000 centipoise; and
   (b) baking said shaped, unbaked dough product to yield a baked dough product; wherein said method does not comprise steaming or boiling the unbaked dough product.

37. The baked dough product of claim 36 wherein the glaze is applied in step (a) in an amount of from about 8 g to about 20 g per 100 g of shaped, unbaked dough product.

38. The baked dough product of claim 36 wherein said unbaked dough product is a bagel or a pretzel.

* * * * *